United States Patent [19]
Khoo

[11] Patent Number: 5,552,915
[45] Date of Patent: Sep. 3, 1996

[54] LIQUID CRYSTAL NON-LINEAR, PHOTOREFRACTIVE ELECTRO-OPTICAL STORAGE DEVICE HAVING A LIQUID CRYSTAL FILM INCLUDING DOPANT SPECIES OF $C_{60}$ OR $C_{70}$

[75] Inventor: Iam-Choon Khoo, State College, Pa.

[73] Assignee: The Penn State Research Foundation, University Park, Pa.

[21] Appl. No.: 325,738

[22] Filed: Oct. 19, 1994

[51] Int. Cl.[6] ............................. C09K 19/52; G02F 1/13
[52] U.S. Cl. ................................. 359/94; 359/95; 359/96
[58] Field of Search .................................. 359/94, 95, 96

[56] References Cited

U.S. PATENT DOCUMENTS

| | | | |
|---|---|---|---|
| 4,751,509 | 6/1988 | Kubota et al. | 359/95 |
| 4,886,718 | 12/1989 | Eich et al. | 359/96 |
| 4,974,941 | 12/1990 | Gibbons et al. | 11/96 |
| 5,024,784 | 6/1991 | Eich et al. | 359/96 |
| 5,032,009 | 7/1991 | Gibbons et al. | 359/96 |
| 5,073,294 | 12/1991 | Shannon et al. | 11/96 |
| 5,118,586 | 6/1992 | Hattori et al. | 430/20 |
| 5,237,435 | 8/1993 | Kurematsu et al. | 359/95 |
| 5,280,373 | 1/1994 | Ozawa et al. | 359/96 |
| 5,447,796 | 9/1995 | Tsukamoto et al. | 428/408 |
| 5,491,579 | 2/1996 | Justus et al. | 359/241 |

OTHER PUBLICATIONS

Schadt et al, "Surface–Induced Parallel Alignment of Liquid Crystals by Linearly Polymerized Photopolymers", Mar. 7, 1992, [Jpn. J. Appl. Phys., vol. 31 (1992), Pt. 1, No. 7].

"Surface–Mediated Alignment of Nematic Liquid Crystals with Polarized Laser Light", W. Gibbons et al., Nature vol. 351, 2 May 1991.

"Real–Time Holography in Azo–Dye–Doped Liquid Crystals", A. Chen et al., Optics Letters, Mar. 1992 vol. 17, No. 6.

*Primary Examiner*—Anita Pellman Gross
*Assistant Examiner*—Toan Ton That
*Attorney, Agent, or Firm*—Thomas J. Monahan

[57] ABSTRACT

Persistent director axis reorientation is induced in a liquid crystal film in response to a projected optical image by a method that includes the following steps: applying adc potential across the liquid crystal film; exposing the liquid crystal film to a spatially varying optical intensity which, in combination with the dc potential, produces a spatially varying dc current flow and a spatial charge field in accordance with the intensity variation of an optical image, the spatial charge field resulting in persistent refractive index changes in the liquid crystal film; and removing the dc potential and spatially varying optical intensity. To retrieve the image that is "stored" in the liquid crystal film, the liquid material is illuminated with a monochromatic optical beam. With certain liquid crystal films, reapplication of the dc potential combined, application of the optical illumination results in retrieval of the stored optical image.

7 Claims, 10 Drawing Sheets

D2

D4

Methyl Red

R6G

5CB

LIQUID CRYSTAL NON-LINEAR, PHOTOREFRACTIVE ELECTRO-OPTICAL STORAGE DEVICE HAVING A LIQUID CRYSTAL FILM INCLUDING DOPANT SPECIES OF $C_{60}$ OR $C_{70}$

FIELD OF THE INVENTION

This invention relates to liquid crystal devices and, more particularly, to a liquid crystal device that exhibits long-term storage of an electro-optically induced optical effect such as images and holograms.

BACKGROUND OF THE INVENTION

Currently, holographic gratings and image storage devices employ inorganic photorefractive crystals. While such crystals perform adequately to provide image storage functions, they are expensive and hard to grow. Liquid crystal films posses similar performance capabilities, and exhibit a number of advantages. In particular, liquid crystal films are highly optically non-linear and, to obtain efficient grating diffraction efficiencies, require films of only a few to tens of microns thickness. Bulk conventional photorefractive crystals require dimensions of several millimeters to accomplish such functions. Further, liquid crystal films are particularly suited to large area fabrication whereas conventional photorefractive crystals are much smaller. Liquid crystal-based devices also exhibit certain unique characteristics: e.g., compatibility with microelectronic and integrated optic circuit technologies; very broad bandwidths; response speeds in millisecond to submillisecond regimes; and very low cost (on the order of two orders of magnitude less than inorganic photorefractive crystals).

Different groups are now developing polymer-based photorefractive liquid crystal materials. Gibbons et al. report on a method for inducing a persistent memory state in polymer-based liquid crystal films which include a dopant dye. The liquid crystal film is exposed by employing a linearly polarized light having a wavelength in the absorption band of the dopant dye within the liquid crystal medium. The linearly polarized light is transmitted through a mask having a pattern, or the beam is scanned and modulated to create the pattern. The beam pattern results in localized reorientations of the liquid crystal domains, which reorientations remain when the incident optical energy is removed. See Gibbons et al. "Surface-Mediated Alignment of Nematic Liquid Crystals with Polarized Laser Light", Nature Vol 351, Pages 49, 50, May 2, 1991 and U.S. Pat. Nos. 4,974,941 and 5,032, 009. U.S. Pat. No. 5,073,294 to Shannon et al. details further work on the polymer-based photorefractive material described by Gibbons et al. and employs the same process for exposure of the liquid crystal media.

Chen et al. in "Real-Time Holography in Azo-Dye-Doped Liquid Crystals", Optics Letters, Vol 17, No 6, pages 441–443, Mar. 15, 1992, describe the use of azo-dye-doped nematic liquid crystal films for providing a holographic storage media. Chen et al. indicate that the photosensitivity of the azo-dye molecules and the large birefringence of the liquid crystal molecules provide an improved holographic storage medium. Chen et al. introduce a sodium salt, 4-dimethylaminoazobenzene-2'-carboxylic acid (an azo-dye molecule) into 4'-pentyl-4-biphenylcarbonitrile (PCB), a nematic liquid crystal host. A pair of argon laser beams record a hologram in the sample cell.

In each of the above-reported prior art teachings, a highly absorbing dye-doped liquid crystal film is employed to store a spatial optical effect. Each of the reported films is highly absorptive causing incident light to be substantially absorbed and to create large temperature fluctuations therein. They also possess low diffraction efficiencies on the order of 0.001. Furthermore, the dye-doped materials require writing times on the order of several tens of minutes.

Accordingly, it is an object of this invention to provide an improved method for inducing a persistently retrievable image in a liquid crystal film.

It is a further object of this invention to provide an improved method for rapidly inducing persistently retrievably optical storage into a doped liquid crystal media.

SUMMARY OF THE INVENTION

Persistent director axis reorientation is induced in a liquid crystal film in response to a projected optical image by a method that includes the following steps: applying a dc potential across the liquid crystal film; exposing the liquid crystal film to a spatially varying optical intensity which, in combination with the dc potential, produces a spatially varying dc current flow and a spatial charge field in accordance with the intensity variation of an optical image, the spatial charge field resulting in persistent refractive index changes in the liquid crystal film; and removing the dc potential and spatially varying optical intensity. To retrieve the image that is "stored" in the liquid crystal film, the liquid material is illuminated with a monochromatic optical beam. With certain liquid crystal films, reapplication of the dc potential combined, application of the optical illumination results in retrieval of the stored optical image.

DETAILED DESCRIPTION OF THE INVENTION

Figure 1A:
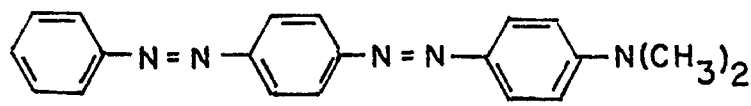
FIGS. 1a–1d illustrate chemical structures of dopants used with the invention hereof.
Figure 1B:
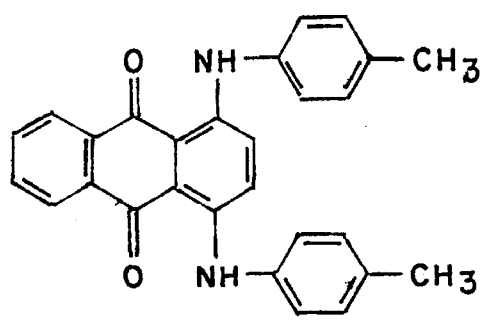
Figure 1C:
Figure 1D:
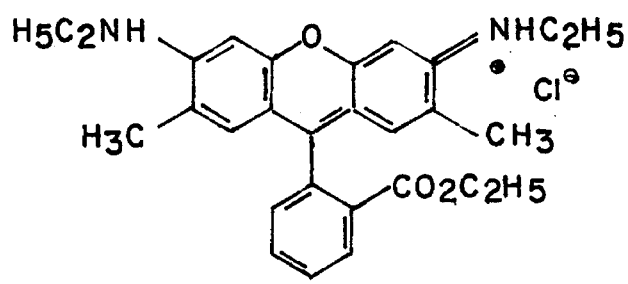
Figure 1E:
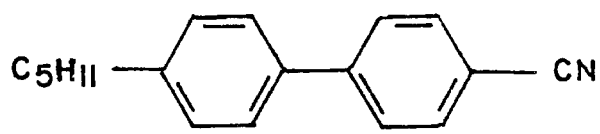
FIG. 1e is a chemical structure of a preferred liquid crystal material used with the invention hereof.

It has been found that a liquid crystal film which includes a small quantity of a dopant, yields a sizeable photo-current upon application of a small dc electric field. The magnitude of the photo-current is an increasing function of impinging optical intensity. If the intensity function is spatially varying, the photo-induced current within the liquid crystal film also spatially varies. Such inhomogeneity of conductivity leads to an accumulation of space charges and a varying space charge field within the liquid crystal film. In combination with the applied dc field, the space charge field causes director axis reorientation and large refractive index changes in the liquid crystal film. The induced index change is quadratically dependent upon the applied electric field, unlike prior art photo-refractive crystals wherein the electro-optical effect is linearly dependent on the electric field.

It has been found that a variety of dyes and other optically absorbent additives to available liquid crystal materials provide excellent photo-current flows and non-linear photorefractive effects. An important feature of this phenomenon is that the director axis reorientation is persistent and provides a storage capability in the liquid crystal material. In other words, the electro-optically induced reorientational effect persists when the applied dc and optical fields are turned off. To read the stored effects requires, with a liquid crystal including certain dopants, that the liquid crystal only need be illuminated by a monochromatic light beam. With other dopants, application of the coherent, polarized beam, combined with re-application of the dc potential, is required.

To accomplish a storage effect in the liquid crystal film only requires trace levels of a dissolved dopant. The liquid crystal films are thus highly transparent. Further, persistence of the induced director axis reorientation is influenced by the period of time that the doped liquid crystal is illuminated by the input beam. Given a long enough exposure (several tens of seconds), the persistence of the induced director axis reorientation is long term. Moreover, the induced index change is no longer polarization selective and non-polarized light can be used to sense the stored image or hologram.

A variety of dopant dyes and other materials have been employed, including dichroic dyes D2 (bis-azo dye) and D4 (anthraquinone dye); the laser dye rhodamine (R6G) (rhodamine chloride) and Methyl Red (4-Dimethylaminoa-zobenzene-2'-carboxylic acid), all of which are soluble, to some extent in the liquid crystal 5CB (pentyl-cyano-biphenyl). The chemical structures of the aforestated dye dopants and liquid crystal media are shown in FIGS. 1a–1e, respectively. In addition, carbon dopant $C_{60}$ (a Fullerene) has been employed and has been found to provide liquid crystal films that exhibit the highest levels of image storage capability. $C_{70}$, due to its similarity to $C_{60}$, also will act similarly to $C_{60}$ when employed as a dopant.

Figure 1F:
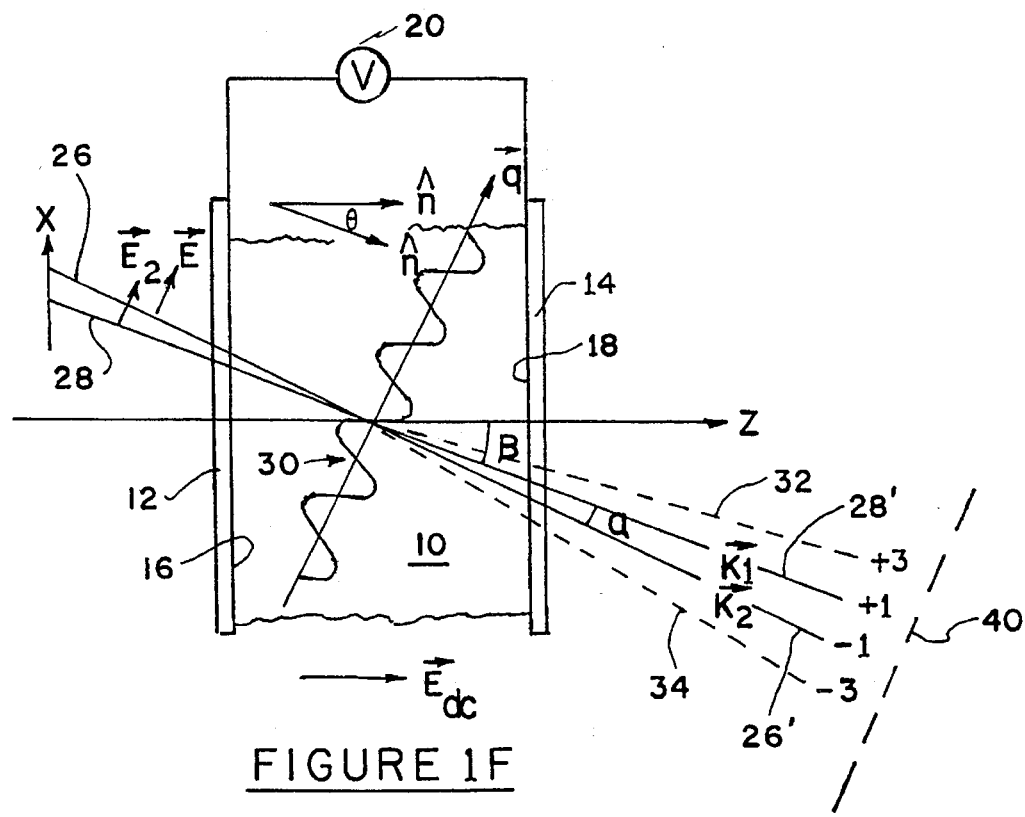
FIG. 1f is a schematic depiction of the geometry of a liquid crystal device incorporating the invention, wherein an electric field is applied across the planar dimension (z axis) of the liquid crystal geometry.

Referring to FIG. 1f, a liquid crystal film 10 is positioned between a pair of glass windows 12 and 14. Conductive electrode coatings 16 and 18 (e.g., indium-tin-oxide) are present on the inner surfaces of glass windows 12 and 14 and, in a known manner, provide an ability to reorient the director axis of liquid crystal film 10 when a voltage source 20 is connected thereacross. Under such conditions, application of voltage source V causes the director axis of the liquid crystal domains to orient as shown by vector ñ (in the x-z plane).

Liquid crystal 10 is a preferably a nematic liquid crystal, however the memory effect will operate in all nematic liquid crystals, as well as ferroelectric and cholesteric liquid crystals. A dopant is present in liquid crystal 10 at a low level. The dopant may be a dye or a carbon form which exhibits optical absorption characteristics at the wave length of an incident light beam. Typically, the dopant material is present in liquid crystal film 10 in a proportion ranging from 0.5% to 0.05% by weight of the liquid crystal material. The preferred range is 0.1% to 0.05% by weight. At such levels liquid crystal film 10 remains highly transparent. While the liquid crystal used for testing of the invention was 5CB (i.e. pentyl-cyanobiphenyl), all nematic liquid crystals and their eutectic mixtures are acceptable. Examples of other liquid crystals are the n=3, 4, 5, 6, 7, 8, 9 of the compound 4-cyano-4 -n-alkylbiphenyls, 80CB[4-n-octyloxy-biphenyl], 50CB[4-n -pentyloxy-biphenyl], 4-cyano-4"-n-alkyl-p-terphenyls, and commercial eutectic mixtures such as E7, E63, E46 and the ZLI-series made by BDH [British Drug House]. Of the dopants tested, $C_{60}$ (Fullerene) performs best, with Rhodamine (R6G) performing best amongst the dye dopants. Even without dopants, liquid crystal materials exhibit a memory affect, given an applied dc potential and concurrent optical exposure (to be described below).

Figure 1G:
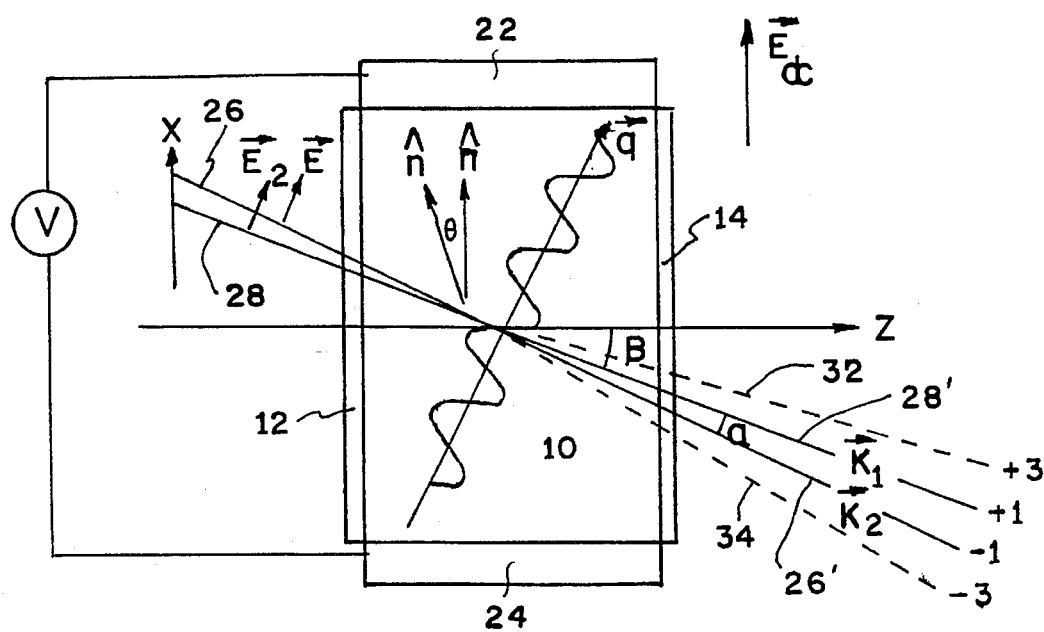
FIG. 1g is a schematic depiction of the geometry of a liquid crystal device incorporating the invention, wherein the electric field is applied along the x-y plane of the liquid crystal geometry.

In FIG. 1g, an identical structure to that of FIG. 1f is shown, except for the fact that glass plates 12 and 14 have no conductive electrodes placed thereon and, instead, conductive electrodes 22 and 24 are placed along the sides of the liquid crystal film 10. The placement of electrodes 22 and 24 assures that the director axis orientation ñ, (upon application of voltage source 20) is in the x-z plane of liquid crystal film 10. The invention is equally applicable to the structure shown in FIGS. 1f or 1g.

A beam from an argon laser (having a wavelength of 5145Å) is divided into two equal path-length, linearly polarized beams 26 and 28, which beams are combined at a very small crossing angle α in liquid crystal film 10. Laser beams 26 and 28 are linearly polarized and propagate as e-waves in liquid crystal film 10, with the optical electric field $E_{op}$ in the x-z plane. Interference between laser beams 26 and 28 creates an intensity grating 30 along the optical electric field direction (which makes an angle of 90°–β with the z axis).

A sizable photo-current is sensed upon application of voltage V across the liquid crystal film 10, with the magnitude of the photo-current being an increasing function of impinging optical intensity. A resulting space charge field pattern is thus established in liquid crystal film 10 and causes director axis reorientation (ñ') and resulting large refractive index changes. The index change is quadratically dependent on the electric field. The index grating created by interfering beam 26 and 28 persists when all applied dc and optical fields are turned off. In other words, the incident optical beams enable the writing of a holographic grating which is "stored" in the reorientated director axes ñ'. To read the stored grating, an interrogating monochromatic optical beam is applied and the diffraction of the beam is sensed (e.g., along plane 40) to provide an indication of the stored image.

As indicated in FIGS. 1f and 1g, beams 26' and 28' are transmission beams corresponding to incident beams 26 and 28, respectively. By contrast, dotted line beams 32 and 34 represent the diffractions experienced by beams 26' and 28' which result due to the persistent director axis reorientation ñ' within liquid crystal material film 10.

The effects obtained occurred only if the incident laser beams are extraordinary e-waves (i.e., optical electric field in the x-z plane) and require the presence of the dc applied field. It has been found that using high frequency ($\geq 10^3$ Hz) ac voltages up to about 20 volts will create no observable effect. This, as well as the characteristic response times (several seconds) of the effect, show that the induced refractive index change is caused by liquid crystal reorientations following photochemical processes in the dye molecules or $C_{60}$, and not thermal effects or the above-Fredericksz-transition optical reorientation effect. For comparison, note that the thermal time constants for the characteristic diffusion length involved in the process are on the order of $<10^2$ milliseconds. Furthermore, a linearly polarized He-Ns laser beam propagating along the writing direction has been used to probe the index grating and has determined that only an e-wave i.e., one polarized in the x-z plane, will yield diffraction; an o-wave probe (i.e., one polarized in the y-direction) will yield vanishing diffraction. This shows that the liquid crystal axis reorientation occurs in the x-z plane, and that the index grating is not due to a perturbation of local order or phase change.

A doped liquid crystal film constructed in accordance with the invention provides a number of advantages over the prior art. Insofar as light transmission is concerned, at a common wavelength, the invention provides greater than 90% transmission as compared to a 1% level of transmission from prior art devices. Liquid crystal films in accordance with the invention allow image reconstruction with a reading beam that impinges from within a large angular range (±45°). Photorefractive crystals, by contrast, only allow highly directional viewing angles, e.g., ±3°. Photorefractive polymers and crystals further require large applied field strengths (e.g., 10,000 V/cm) as compared to the invention which requires a field strength of approximately 100 V/cm.

The doped liquid crystal film can also store the image of a tightly focussed laser beam, which electro-optically creates a miniature "lens" of micron dimension in the film. A beam of light of this dimension is greatly focussed/defocussed and transmission of the beam at a distance further downstream (approximately 1 cm or less) is practically zero. By contrast, an unexposed region of the liquid crystal film will enable almost total transmission of the reading beam. Such "0" and "1" transmission characteristics may be sensed by any of a plurality of semiconductor photosensitive detectors to enable a data output therefrom. Further, as above indicated, a prestored hologram can be projected by simply illuminating the liquid crystal film with an appropriate laser beam.

Experimental Results

Figure 2A:
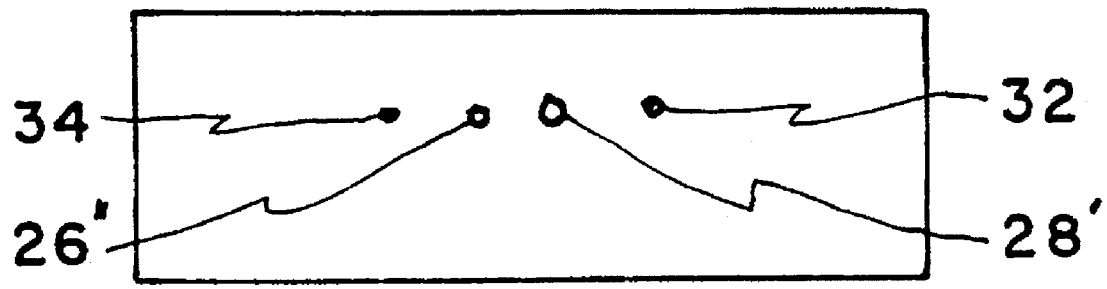
FIG. 2a illustrates diffraction effects experienced by a polarized beam incident on a liquid crystal film as shown in FIG. 1f.
Figure 2B:
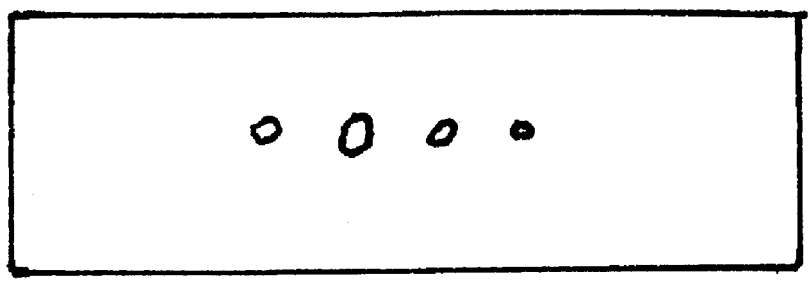
FIG. 2b illustrates the diffraction effects experienced by a polarized beam incident on a liquid crystal film as shown in FIG. 1f.

FIGS. 2a and 2b show the forward transmitted beams 26' and 28' and side-diffractions 32, 34 for a wave mixing angle $\alpha=1.8\times10^{-3}$ rad and V=1.2 Volts. FIG. 2a corresponds to the case where the applied dc electric field $\vec{E}_a$ is in the +z direction and the laser incident angle β=0.5 radian. In this case, the +1 beam power experiences gain (from 22 mW to 30 mW), whereas the −1 beam experiences a loss (from 21 mW to 5 mW). The situation is reversed if the direction of $\vec{E}_a$ is applied in the −z direction. As shown in FIG. 2b, the transmitted +1 beam now experiences a loss (from 22 mW to 6.5 mW) whereas the −1 beam experiences gain (from 21 mW to 28 mw).

The side diffractions are very strong. They become visible at an input power as low as 0.5 mW. At an input power of 10 mW and an applied dc voltage V of 1.25 Volt, the diffraction efficiency is 5%. In general, the power distribution of the diffraction is asymmetric with respect to the ± beam power; and the diffraction on the side of the beam experiencing gain is observed to be considerably weaker than its counterpart on the side of the beam experiencing loss. For example, with reference to FIG. 2a, the +3 beam is weaker than the −3 beam (by a factor of 2.5), even though the +1 beam has become much stronger than the −1 beam. Similarly, for the case where the applied field direction is reversed, as in FIG. 2b, the −3 diffraction is weaker than the +3 diffraction even though the −1 beam is now stronger than the +1 beam. If the applied field is turned on abruptly, the power distribution of the diffracted beams is observed to be changing with time, and occasionally only one diffracted beam is observed. For the diffraction efficiency measurement, therefore, the applied field is turned on gradually, and more stable diffraction patterns are observed.

Figure 3:
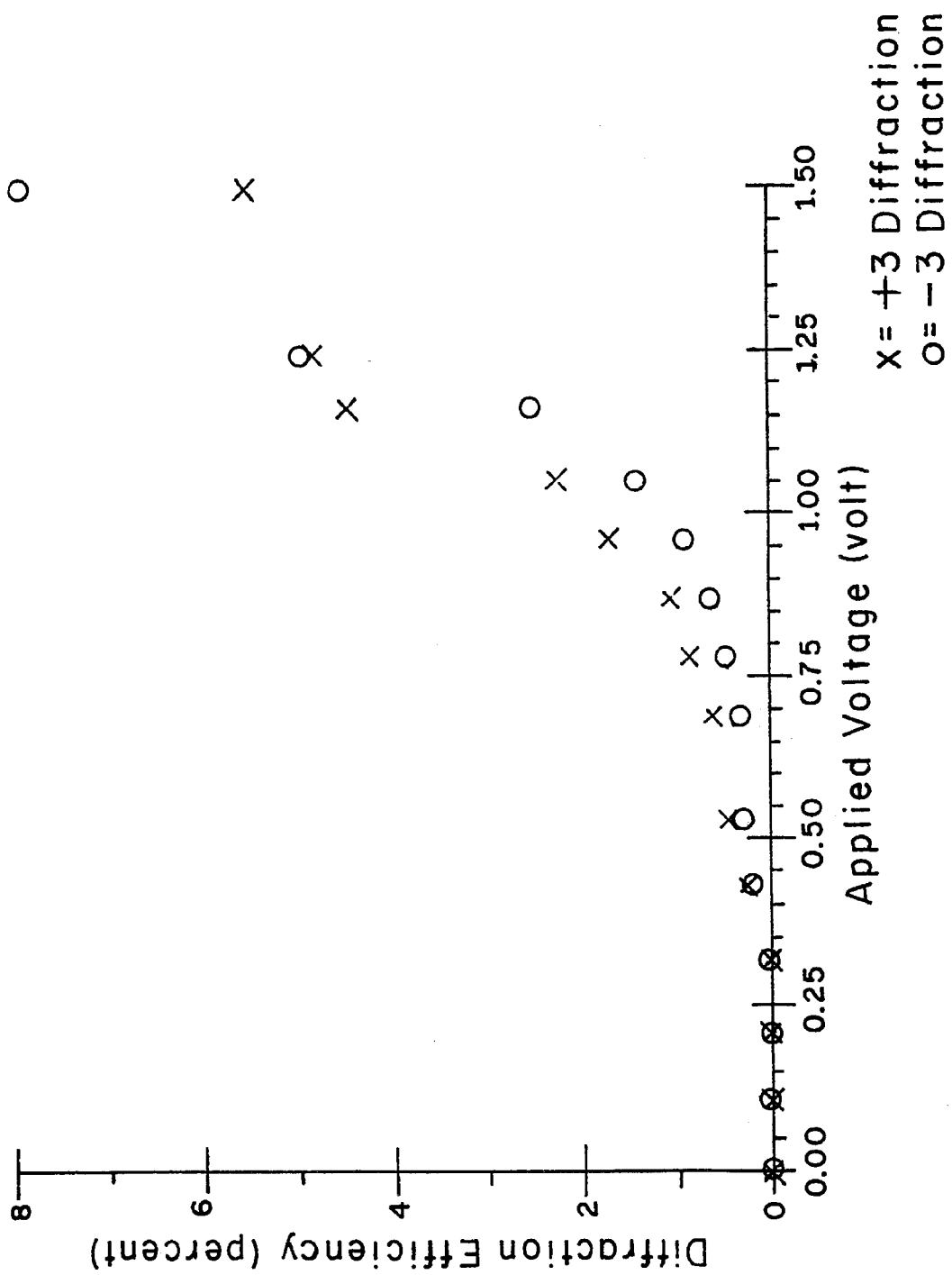
FIG. 3 is a plot of observed dependence of first order diffraction efficiencies as a function of applied dc voltages across the liquid crystal media.

FIG. 3 shows diffraction efficiency as a function of the applied dc voltage V. The dc field is along the +z direction. The incident +1 and −1 beam powers are, respectively, 11.2 mWatt and 8.8 mWatt. β=30.8°. No diffractions are observed when V=0. This, as well as numerical estimates given below, rule out a purely optical field-induced reorientational effect as the responsible mechanism. Visible diffractions are observed above an applied voltage of 0.5 volt. The diffractions increase substantially when the applied voltage exceeds 1.10 Volts, reaching 5% at V=1.25 Volts. For applied voltages up to 1.2 volts, the +3 diffraction efficiency (as plotted by X's) is higher than the −3 (as plotted by O's). Above 1.25 volts, higher order diffractions (+5, +7) are observed on the +3 side; at this point, it is observed that the +3 efficiency become lower than the −3 diffraction which remains the only visible one on this (the −1 beam) side.

Figure 4:
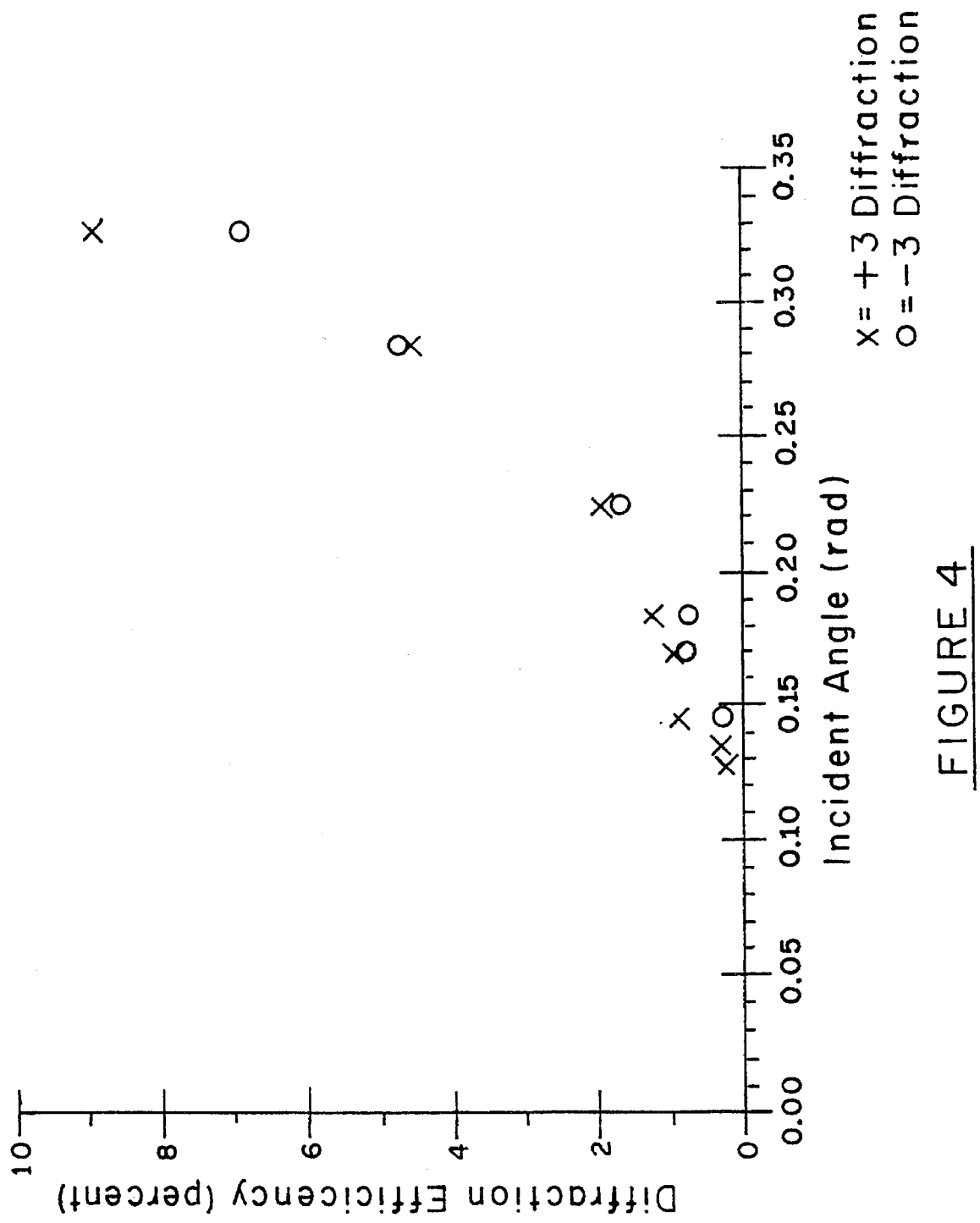
FIG. 4 is a plot of observed first order diffraction efficiencies as a function of beam propagation angle $\beta$.

Diffraction efficiency is highly dependent on the incident angle β. FIG. 4 shows the observed β-dependence, for the case where $\alpha=1.8\times10^{-3}$ rad and incident beam powers of 4.4 mW and 5.6 mW for the +1 and −1 beams, respectively. $\vec{E}_a$ is along +z direction. As shown in the theoretical analysis below, the observed β-dependent results are in good agreement with the theoretical prediction that the efficiency varies as $(\sin 2\beta \cos \beta)^2$.

For $\alpha=1.8\times10^{-3}$ rad., the grating constant $\lambda_g$ is 280 μm. Since $\lambda_g \gg d\lambda$ (d: thickness of liquid crystal film 10; λ: optical wavelength of beams 26, 28), the diffraction is of the Raman-Nath type. The first order efficiency η is $$\sim \left( \frac{\Delta n_e \pi d}{\lambda} \right)^2,$$

where $\Delta n_e$ is the amplitude of the induced index grating. Using d=100 μm, λ=0.5145 μm, and the experimentally observed η=0.05 at V=1.25 Volt, it is found that $\Delta n_e = 0.36 \times 10^{-3}$. Since the optical intensity is 0.2 Watts/cm² (20 mWatt in a spot diameter of 2.5 mm), the nonlinear index coefficient $n_2$, defined by $n_2 I = \Delta n$ is thus $1.8 \times 10^{-3}$ cm²/Watt. This is more than 20 times the purely optical field induced reorientational nonlinearity of about $5 \times 10^{-5}$ cm²/Watt. The applied dc field clearly plays a crucial role in producing this large nonlinearity. Without the dc field, the optical power needed to generate observable diffraction is found to be at least 400 mWatts (intensity of 6 Watts/cm²).

Analysis and Observation of Photo-Induced dc Currents

The exact mechanism occurring in the photo-excited dye molecules, and the subsequent interaction with the dc field remains to be ascertained. A plausible explanation is based on the excited dye-molecules' photochemical properties. The dye molecules have undergone chemical change upon photo-excitation, as has been observed in other studies. The sample region under optical illumination is observed to be sightly discolored from the rest of the sample. The excited molecules could create the following effects:

(1) The excited dye molecules undergo reorientational or structural transformation. This produces an intermolecular field between molecules situated at the optical intensity maxima and those in the minima. The intermolecular field exerts reorienting torques on the liquid crystal and causes director axis reorientation. This effect has been observed in other studies on nematic liquid crystal doped with absorbing dyes, or (2) The photo-excited dye molecules, undergo heterolytic dissociation and produce mobile ions. In analogy to photo-induced charge carriers in photorefractive materials, these positive and negative ions set up a space charge field as a result of the spatial conductivity anisotropy. The space charge fields are directed along the $\pm\vec{q}$ direction, where $\vec{q}$ is in the plane of the interference grating.

The contribution of effect (1) above is ruled out by the observation that, when the dc field is turned off, there is no observable effect at all. This is contrary to the excited-dye molecular transformation effect, which does not required any applied dc field.

That effect (2) may play the main role is demonstrated by the observation of laser induced dc currents in the dye-doped nematic liquid crystal film..The measured values for the dc current difference (between the illuminated and the dark states), which is henceforth termed photocurrent, for samples doped with a variety of dyes, and their absorption constants are summarized in Table 1 below.

| Dyes | $\alpha$ (cm$^{-1}$) | Photocurrent ($\mu$A) | I/$\alpha$ ($\mu$A · cm) |
|---|---|---|---|
| D2 | 264 | 0.45 | $1.70 \times 10^{-3}$ |
| D4 | 3.4 | 0.01 | $2.94 \times 10^{-3}$ |
| Methyl Red | 63 | 0.475 | $7.54 \times 10^{-3}$ |
| R6G | 5.5 | 0.125 | $2.27 \times 10^{-2}$ |

Table 1
Photoinduced current in 100 μm thick hometropically aligned nematic films doped with several dyes. Laser power used ~100 mWatt, applied dc voltage of 2 volts. Sample area under illumination is 4 mm². The experimental geometry used is that of FIG 1f, with $\beta = 0$ and a single incident beam.

Notice that the ability to generate ions and therefore photocurrents is not correlated to the absorption constant. In terms of photocurrent per absorption rate, I/$\alpha$, the laser dye R6G appears to be highly efficient. This is likely due to the particular ion-yielding photochemical processes occurring in R6G mentioned above that have been observed in other studies. It is noted that the function of the dopant is to increase the photocurrent, which is present even in undoped samples.

Figure 5A:
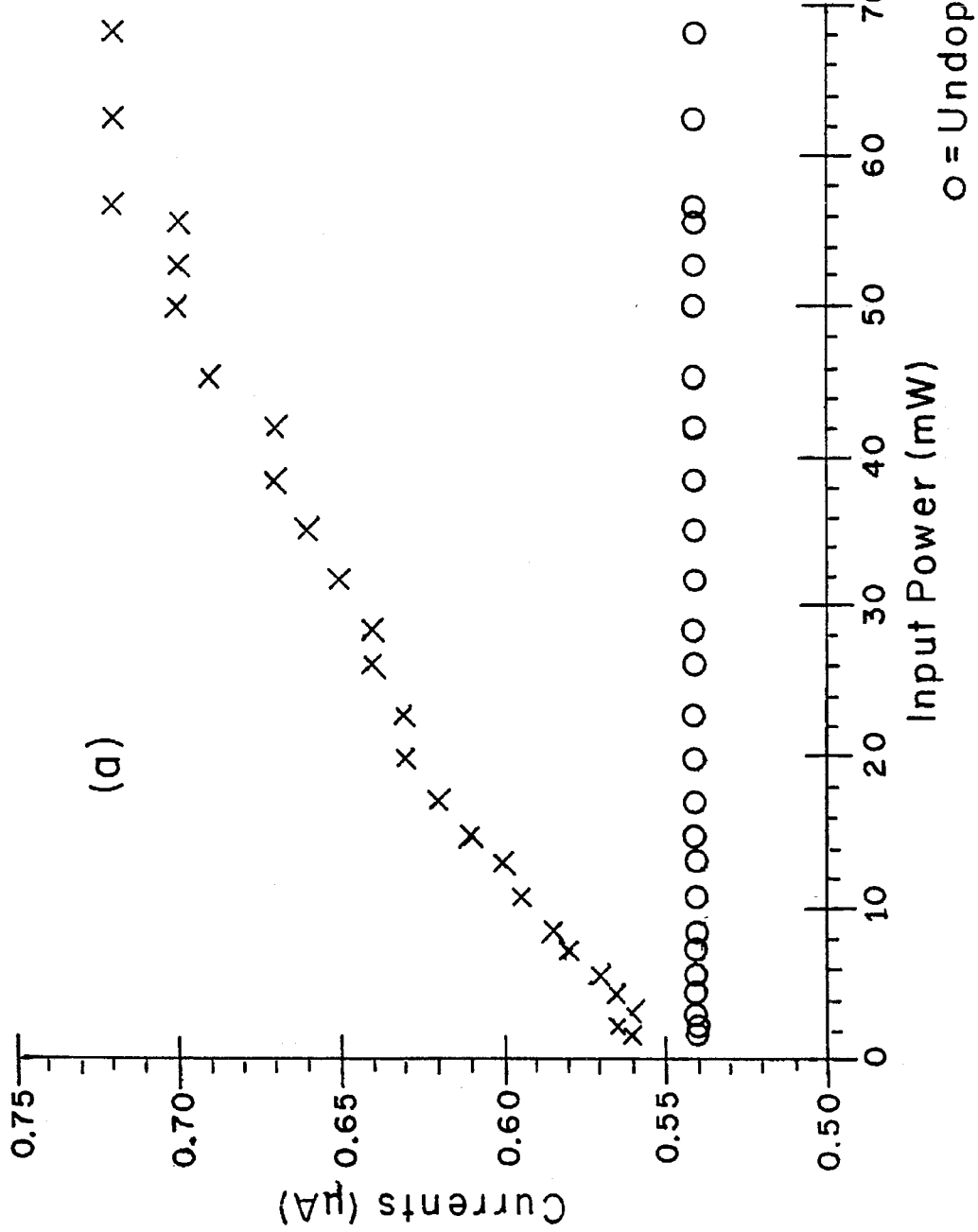
FIG. 5a is a plot of observed dc current across the liquid crystal media for various incident laser powers.

FIG. 5a shows the dc currents detected across the R6G-doped liquid crystal film as a function of the incident laser power (over the entire sample area). The applied voltage is 1.22 Volt. Circles are for pure undoped 5GB sample. Crosses are for an R6G doped sample. Note that the dc current across the pure undoped sample (arising from impurity ions) remains basically unchanged at the applied voltage, as the incident laser power is increased. On the other hand, the doped sample shows a dc current that increases with the incident laser power. The dependence of the photocurrent on the optical intensity $I_{op}$ is close to $(I_{op})^{1/2}$ dependence. This dependence on the incident laser power is consistent with the argument for effect (2) mentioned above, namely, the generation of mobile ions from dissociations of the photo-excited molecules.

Figure 5B:
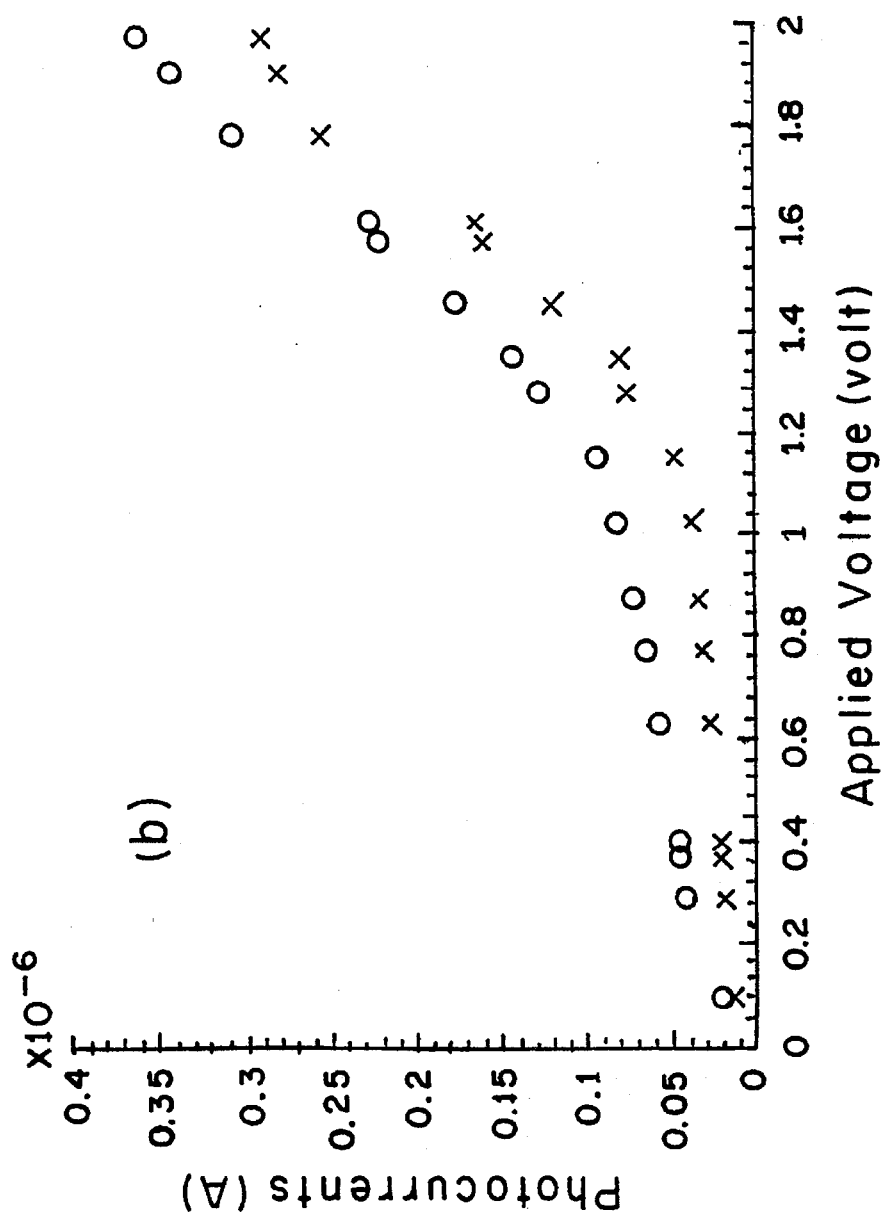
FIG. 5b is a plot of observed dependence of current across a liquid crystal media, including a dye, for variations in applied voltage.

FIG. 5b shows how the dc current varies as the applied voltage across the doped sample is increased. Circles are for the dark state and crosses are values obtained when the sample is illuminated by a 10 mWatt laser beam. Above an applied voltage of 1.25 V, the rate of change shows a marked increase. This is due to field ionization of the dopants and other impurities present in the liquid crystals. The dark state conductivity of the sample at V=1 Volt is measured to be about $5 \times 10^8$ ohm$^{-1}$ cm$^{-1}$.

Figure 5C:
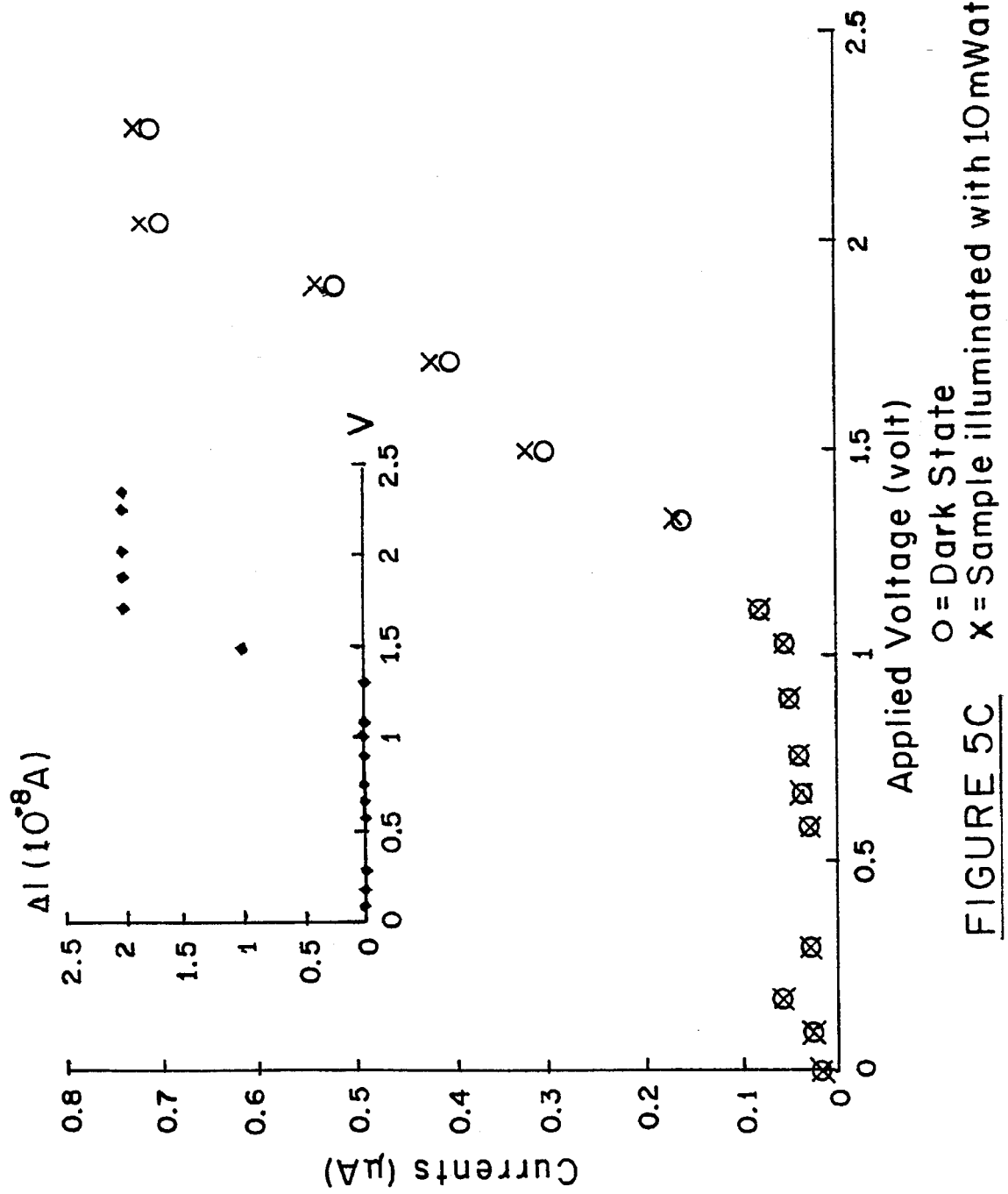
FIG. 5c is a plot of observed dependence of current across a pure undyed liquid crystal media with variations of dc applied voltage.

In a pure undoped sample, above an applied voltage of 1.25 V, similar increases are observed in the current flows when the sample is illuminated. FIG. 5c (cross and circles are the same as for FIG. 5b) shows the dependence of the current on the applied dc field. Also plotted (as the insert) is the difference $\Delta I$ between the dark and illuminated-state currents, i.e., the photocurrent versus V. The magnitude of $\Delta I$ for the pure sample, where current originates from ions and ionizable impurities present is on the order of $2 \times 10^{-8}$ Amp at 1.5 Volt. On the other hand, the dyed-doped sample yields about $6 \times 10^{-8}$ Amp. This difference is reflected in the wave mixing efficiencies obtainable from the pure and doped sample.

Figure 6:
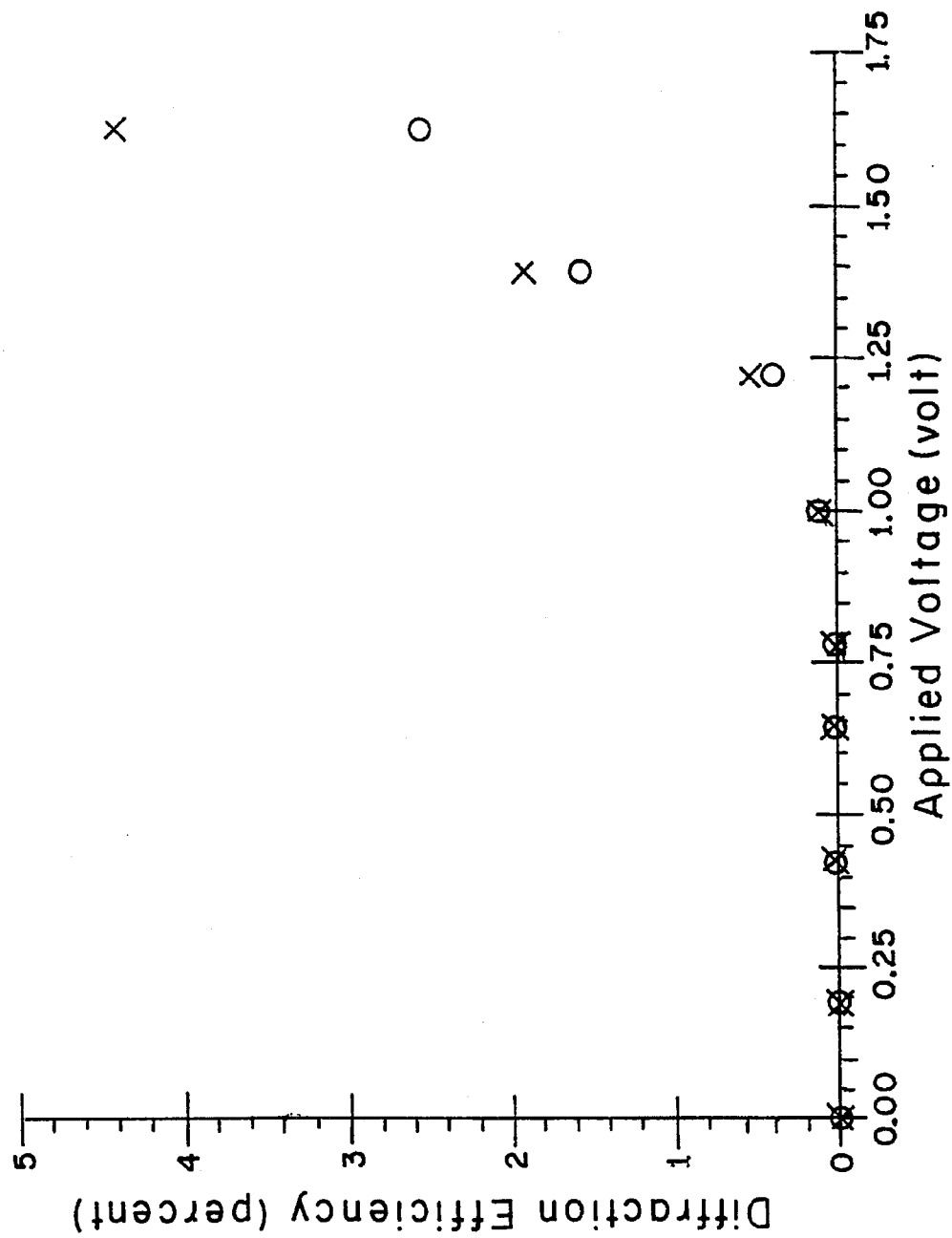
FIG. 6 is a plot of measured first order diffraction efficiencies as a function of an applied dc voltage.

FIG. 6 shows the ±3 beam diffraction efficiency as a function of the applied voltage from a pure sample. Cross are for the ±3 beam. Input powers are: 8.8 mWatt for +1 beam and 11.2 mWatt for the −1 beam. $\beta$=30.8°. At 1.5 Volt, the efficiency is on the order of 2%. Under the same experimental conditions, the doped sample yields about 6% or more.

Experimental results from a $C_{60}$ doped liquid crystal film indicate a diffraction efficiency that is a −10 times better than a liquid crystal film doped with R6G. For $C_{60}$, $\Delta I/I=0.3$, where $\Delta I$ is the photo-induced current and I is the current without illumination. For R6G, $\Delta I/I=0.1$.

Figure 7:
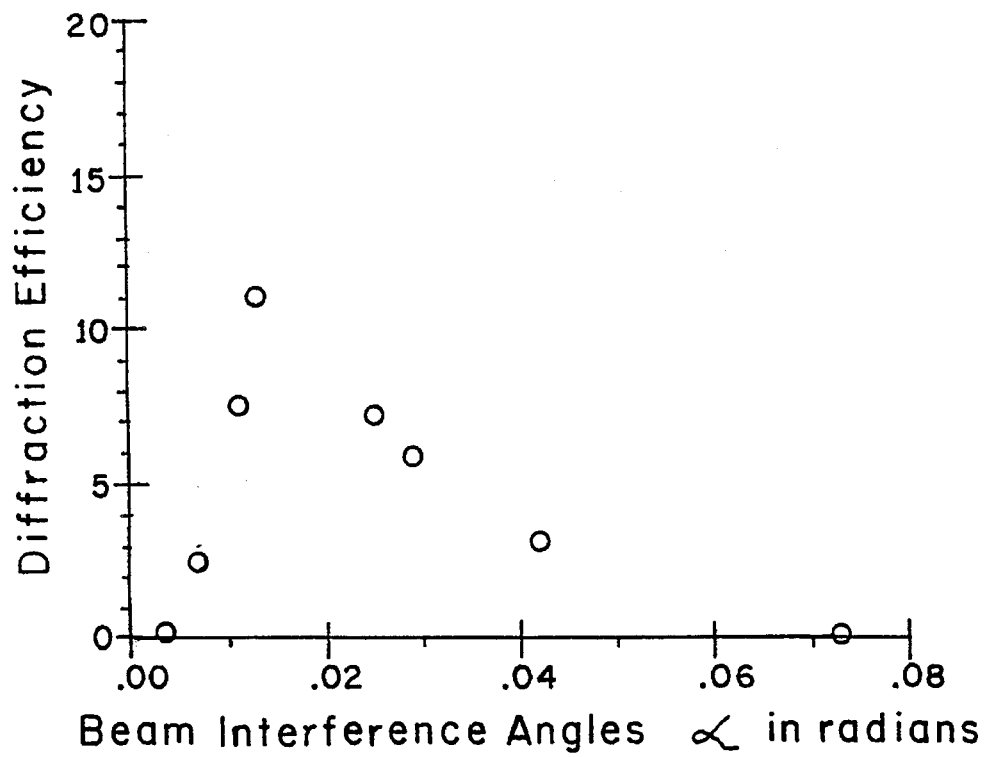
FIG. 7 is a plot of diffraction efficiency versus beam interference angle for $C_{60}$.
Figure 8:
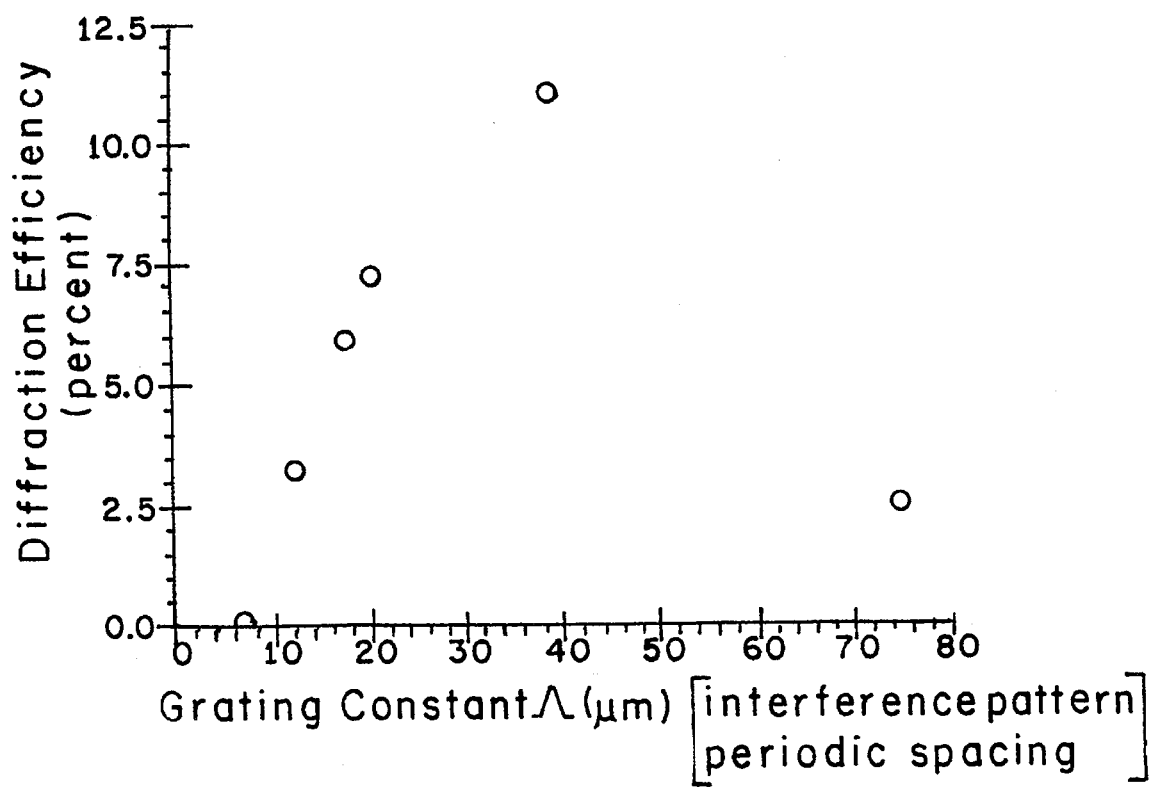
FIG. 8 is a plot of diffraction efficiency versus grating constant for $C_{60}$.

The diffraction efficiency improvement can be seen from examination of FIGS. 7 and 8. FIGS. 7 and 8 plot diffraction efficiency (%) against beam interference angle and against grating constant, respectively. In both cases a nematic liquid crystal film (5CB) was doped with $C_{60}$. The film thickness was 25 microns. The voltage V 1.5 volts and the concentration of $C_{60}$=0.05% by weight.

The structure and absorption spectra of $C_{60}$ and $C_{70}$ are given by Ajie et al. in *The Journal of Physical Chemistry*, Vol. 94, pp. 8630–8633 (1990).

Theory of Orientational Photorefractive Effect

It is well-known from other studies of dc-field induced current flows in nematic liquid crystals that space charge fields can be set up owing to conductivity anisotropy. In the present case, the conductivity anisotropy varies spatially with the optical intensity grating function. Accordingly, space charges accumulate in a periodic manner, resulting in a periodic dc field $\vec{D}_{sc}$. Since $\vec{D}_{sc}$ is derived from the accumulated space charge density $\rho(\vec{r})$ by the relationship $\vec{\Delta} \cdot \vec{E}_{sc} = -\rho(\vec{r})/_E$, while $\rho(\vec{r})$ follows the periodicity of the optical intensity grating, $\vec{E}_{sc}$ is phase-shifted with respect to the optical intensity grating function. If the optical intensity grating is of the form $\cos(q\zeta)$, the space charge field will vary as $\cos(q\zeta+\phi_{sc})$, where $\phi_{sc}$ is the phase shift, in analogy to photoionization and space charge field generation in photorefractive crystals.

The fact that the diffraction and wave mixing effects occur only with the aid of the applied dc field shows that the space charge field $\vec{E}_{sc}$ (and/or the molecular field) is, by itself, not sufficient to create observable liquid crystal reorientation. The dc field $\vec{E}_a$ enhances its effect via a heterodyning process owing to the fact that the director axis reorientational process depends quadratically on the total field, i.e., proportional to $(\vec{E}_a+\vec{E}_{sc})^2$.

More specifically, $$\vec{E}_a(0, 0, E_a) \qquad (1)$$

and $$\vec{E}_{sc}=(E_{sc}\cos\beta, 0, E_{sc}\sin\beta)\cos(q\zeta+\Phi_{sc}) \qquad (2)$$

The total electric field $\vec{E}$ present is therefore $$\vec{E}=[E_s\cos\beta\cos(q\zeta+\Phi_{sc}), 0, E_{sc}\sin\beta\cos(q\zeta+\Phi_{sc})+E_a] \qquad (3)$$

This produces a torque $\overline{m}$ on the liquid crystal $$\overline{m} = -\frac{\Delta\epsilon}{4\pi}(\hat{n}\cdot\vec{E})(\hat{n}\times\vec{E}) \qquad (4)$$

which is counteracted by the elastic torques, as well as the conductivity-induced torques. The latter involves flow and shear stresses, processes that are further complicated by the director axis reorientation. For a qualitative understanding of how the space-charge and applied dc fields may create director axis reorientation, ignore flows for the moment. Using a one-elastic-constant approximation, and for small reorientation angle $\zeta$, the torque balance equation becomes $$K\frac{\partial^2\theta_0}{\partial Z^2} + \frac{\Delta\epsilon}{4\pi} E_a E_{sc}[\cos 2\theta\cos\beta + \sin 2\theta\sin\beta] = 0 \qquad (6)$$

where K is the effective elastic constant.
Considering the spatially varying component of the reorientation:

$$U=U_o\cos(q\zeta+\phi_{sc}) \qquad (7)$$

A solution of equation (6) under the hard boundary condition [U=0 at z=0 and at z=d] is:

$$\theta_0 \sim \frac{|\Delta\epsilon|E_a E_{sc}}{8\pi K} \cos\beta(dz-z^2) \qquad (8)$$

The induced extraordinary wave refractive index grating $\Delta n = n_e(\beta=U)-n_e(\beta)$ is thus given by $$\Delta n = \Delta n_e \cos(q\zeta+\phi_{sc})E_a E_{sc} \qquad (9)$$

where $$\Delta n_e = (n_\parallel - n_\perp)\frac{n_\parallel}{n_\perp}(\sin 2\beta)\theta_0 \qquad (10)$$

From equation (5), it can be seen that if the direction of the dc field is reversed, i.e., $E_a \to -E_a$, it is equivalent to shifting the grating function by $\pi$, i.e., $\cos(q\zeta+\phi_{sc}) \to \cos(q\zeta+\phi_{sc}+\pi)$. This reverses the direction of energy transfer in the two wave mixing process. This is observed in the experiments, see the discussion of FIGS. 2a–b. Note that since the sign and magnitude of $\phi_{sc}$, as well as $E_{sc}$, could also depend on the applied electric field direction, the actual dc field dependence of the wave mixing processes may be more complicated.

The presence of this non-vanishing phase shift, and the dependence of the total phase shift on the direction of the applied field may also account for the peculiar power distribution of the diffracted beams. Considering incident and diffracted beams, diffracted beams are naturally phase shifted from the incident beams as a result of the nonlinear optical wave mixing process. Such a nonlinear wave-mixing phase shift and the dc field dependent $\phi_{sc}$ are brought together into a complicated interplay, leading to the asymmetrical power distribution in the diffracted beams.

From equations (8) and (10), the diffraction efficiency, which is proportional to $(\Delta n_e)^2$, has a $(\sin 2\beta \cos\beta)^2$ dependence. This is in agreement with the experimental results shown in FIG. 4. The dependence of the diffraction efficiency on the applied voltage is less clear cut, primarily owing to the fact that the space charge field $E_{sc}$ is also dependent on the applied voltage. Nevertheless, it is believed that the diffraction efficiency depends, at least, quadratically on the applied voltage before the field-ionization effect sets in at around 1 Volt, and then increases more dramatically with the applied voltage much as the photo-induced current. This is shown in FIG. 3.

As above noted, the optically induced dc-field nonlinearity is much stronger than purely optical field induced reorientational effect. The key factor lies in the vast difference in magnitude between dc dielectric constant $\Delta\epsilon_{op}$. Typically $\Delta\epsilon=10$, whereas $\Delta\epsilon_{o\,p}=n_1^2-n_{TW}\sim 0.5$, i.e., $\Delta\epsilon/\Delta\epsilon_{op} \sim 20$. Hence dc fields are much more effective in creating director axis reorientation effect. This is borne out by experiment. The observed nonlinearity coefficient $n_2$ is more than an order of magnitude larger than the purely optical induced reorientational nonlinearity.

To obtain an estimate of the space-charge field $E_{sc}$ compared to the optical field, consider the torque balance equation under an optical field for the same interaction geometry, c.f., FIG. 1a (with $Ed_c=0$). This gives:

$$K\frac{\partial^2\theta_0}{\partial Z^2} + \frac{\Delta\epsilon_{op}}{4\pi} E_{op}^2[(\cos 2\beta)\theta + \sin\beta\cos\beta] = 0 \qquad (11)$$

where $\Delta\epsilon_{op}=n_1^2-n_1^2$ is the optical dielectric anisotropy. This gives $$\theta_0(\text{opt}) = \frac{\Delta\epsilon_{op}}{8\pi k} E_{op}^2 \sin\beta\cos\beta(dz-z^2) \qquad (12)$$

Comparing the dc field induced effect, i.e., equation (8) and (12), gives $$\frac{\theta_0}{\theta_0(opt)} = \frac{\Delta\epsilon}{\Delta\epsilon_{op}} \frac{E_a E_{sc}}{E_{op}^2 \sin\beta} \qquad (13)$$

From experiments conducted, the optical intensity needed to generate the same magnitude of diffraction (i.e., 5%) is 6 Watts/cm². This corresponds to an optical field $|E_{op}|$ of 67 Volt/cm. Given that B=30.8°, $\Delta\epsilon_{op}=0.66$, leads to $\Delta\epsilon E_a E_{sc}=1517$ (volt/cm)². From the experimental value $E_a=125$ V/cm (V=12.5 volt in 100 μm thick sample), gives $\Delta\epsilon E_{sc}=12$ Volt/cm. Note that dielectric anisotropy of pure 5CB is typically about 17, whereas its value for the highly conductive photo-excited dyed sample remains to be characterized. In any case, observations have clearly shown that the optically induced dc fields are much more effective in causing director axis reorientation, requiring an optical intensity of only 0.2 Watts/cm$^2$ compared to 6 Watts/cm$^2$ for purely optically induced effect.

From the above, it can seen that substantial, persistent nonlinear photodiffractive effects can be induced in aligned nematic liquid crystals with the aid of a weak applied dc field in combination with an incident optical beam. The optical beam can induce a hologram image in the nematic liquid crystal film, which hologram is then accessible by illumination of the film with a monochromatic beam. If the liquid crystal is doped, the nonlinear photorefractive effect is both increased and highly persistent. The most preferred dopants are C60 and rhodamine (R6G). The dopant levels are in the range of 0.5% to 0.05% by weight of the liquid crystal, leading to a very lightly doped liquid crystal that is highly transparent. The preferred range is 0.1% to 0.05% by weight. Dc voltage applied across the liquid crystal is preferably in the range of 1–2 Volts with a preferred range being 1.2 Volts to 2 Volts. Erasure of the stored image can be achieved by application of either optical, thermal or electrical energy to the liquid crystal material so as to achieve a reorientation of the director axes.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for inducing a persistently retrievable director axis reorientation in a liquid crystal film, comprising the steps of:

applying a dc potential across said liquid crystal film; and exposing said liquid crystal film to a spatially varying optical intensity to induce therein a spatially varying charge field in accordance with said spatially varying optical intensity, said varying charge field resulting in corresponding persistent reorientations of director axes within said liquid crystal film and, accordingly, corresponding refractive index changes therein Said liquid crystal film including a dopant species that is absorptive at a wavelength of said varying optical intensity, said dopant species being $C_{20}$ or $C_{70}$.

2. The method as recited in claim 1, including further steps to sense said director axis reorientations comprising the further steps of:

illuminating said liquid crystal film with a monochromatic optical beam so as to enable said beam to be diffracted in accordance with said persistent refractive index changes; and sensing an image which results from said illuminating step.

3. The method as recited in claim 2 wherein said spatially varying optical intensity manifests a binary data pattern and said sensing step operates with a sensing means that is positioned in relation to said liquid crystal film so as to distinguish between exposed and non-exposed binary data regions when said said exposed and non-exposed binary data regions are illuminated by a reading optical beam.

4. The method as recited in claim 1, wherein said spatially varying optical intensity is created by interfering two polarized, coherent beams, one beam further spatially modulated in an image form, said spatially varying optical intensity being a hologram of said image form.

5. The method as recited in claim 1 wherein said dopant species is present in said liquid crystal film in a range of 0.5% to 0.05% by weight of liquid crystal material.

6. The method as recited in claim 1 wherein said dc potential is within the range of 1 to 2 Volts.

7. The method as recited in claim I where said liquid crystal film is selected from the group consisting of: nematic liquid crystals and eutectic mixtures of nematic liquid crystals.

* * * * *

UNITED STATES PATENT AND TRADEMARK OFFICE
CERTIFICATE OF CORRECTION

PATENT NO. : 5,552,915
DATED : September 3, 1996
INVENTOR(S) : Iam-Choon Khoo

It is certified that error appears in the above-indentified patent and that said Letters Patent is hereby corrected as shown below:

Column 12, line 6: after "being", replace "$C_{20}$" with --$C_{60}$--

Signed and Sealed this

Seventh Day of January, 1997

Attest:

BRUCE LEHMAN

Attesting Officer   Commissioner of Patents and Trademarks